(12) United States Patent
Chuang (10) Patent No.: US 10,079,921 B2
(45) Date of Patent: Sep. 18, 2018

(54) GUIDE RAIL TYPE FLIP-UP MECHANISM

(71) Applicant: DEDA METAL CO., LTD., New Taipei (TW)

(72) Inventor: Kun-You Chuang, New Taipei (TW)

(73) Assignee: DEDA METAL CO., LTD., New Taipei (TW)

( * ) Notice: Subject to any disclaimer, the term of this patent is extended or adjusted under 35 U.S.C. 154(b) by 0 days.

(21) Appl. No.: 15/632,387

(22) Filed: Jun. 25, 2017

(65) Prior Publication Data

US 2017/0295268 A1    Oct. 12, 2017

(51) Int. Cl.

| | | |
|---|---|---|
| *E05D 15/00* | (2006.01) | |
| *H04M 1/02* | (2006.01) | |
| *F16C 11/04* | (2006.01) | |
| *H05K 5/02* | (2006.01) | |
| *E05D 11/10* | (2006.01) | |
| *E05F 1/00* | (2006.01) | |

(52) U.S. Cl.
CPC ........... *H04M 1/0216* (2013.01); *F16C 11/04* (2013.01); *H04M 1/02* (2013.01); *H05K 5/02* (2013.01); *E05D 11/10* (2013.01); *E05F 1/00* (2013.01)

(58) Field of Classification Search
CPC ...... H05K 5/02; H05K 5/0226; G06F 1/1681; G06F 1/1616; G06F 1/1679; E05Y 2900/606; E05Y 2900/60; H04M 1/02; H04M 1/002; H04M 1/0214; H04M 1/0216; E05D 3/122; E05D 3/12; E05D 3/16; E05D 3/18; E05D 3/06; E05D 3/32; E05D 11/10; E05D 11/1078; E05D 11/1021; F16C 11/04; E05F 1/00

See application file for complete search history.

(56) References Cited

U.S. PATENT DOCUMENTS

| | | | | |
|---|---|---|---|---|
| 4,960,256 A | * | 10/1990 | Chihara | G06F 1/1616 16/361 |
| 5,494,447 A | * | 2/1996 | Zaidan | G06F 1/1618 16/361 |
| 7,725,988 B2 | * | 6/2010 | Kim | G06F 1/1616 16/357 |
| 8,250,711 B1 | * | 8/2012 | Chen | E05D 7/081 16/239 |
| 2009/0134286 A1 | * | 5/2009 | Lee | F16M 11/10 248/125.1 |
| 2010/0299873 A1 | * | 12/2010 | Song | G06F 1/1624 16/236 |

(Continued)

*Primary Examiner* — Chuck Mah (57) ABSTRACT

A guide rail type flip-up mechanism includes a base unit including a first connection member affixed to a main unit of a flip electronic product and a guide rod and a first pivot axle disposed at one same side relative to the first connection member, a linkage unit including a pivoting member with one end thereof pivotally connected to the first pivot axle and an opposite end thereof providing a second pivot axle and a displacement member with a third pivot axle coupled to the guide rod and movable back and forth along the guide rod, and a flip member including a second connection member affixed to the display of the flip electronic product and a first axle barrel and a second axle barrel located at one lateral side of the second connection member and respectively coupled to the second pivot axle and third pivot axle of the linkage unit.

5 Claims, 7 Drawing Sheets

(56) References Cited

U.S. PATENT DOCUMENTS

| | | | | |
|---|---|---|---|---|
| 2012/0188703 A1* | 7/2012 | Yang | H04M 1/0237 | 361/679.27 |
| 2012/0217855 A1* | 8/2012 | Chen | G06F 1/1616 | 312/323 |
| 2012/0314980 A1* | 12/2012 | Chen | H04M 1/0237 | 384/26 |
| 2012/0328222 A1* | 12/2012 | Chen | G06F 1/1616 | 384/26 |
| 2013/0112818 A1* | 5/2013 | Hsu | F16M 11/10 | 248/121 |
| 2014/0026368 A1* | 1/2014 | Katsuta | G06F 1/1624 | 16/362 |
| 2014/0331454 A1* | 11/2014 | Hsu | H05K 5/0226 | 16/368 |
| 2016/0320811 A1* | 11/2016 | Lin | G06F 1/1681 | |
| 2016/0369543 A1* | 12/2016 | Park | E05D 11/082 | |
| 2017/0139446 A1* | 5/2017 | Lan | G06F 1/1681 | |

\* cited by examiner

GUIDE RAIL TYPE FLIP-UP MECHANISM

BACKGROUND OF THE INVENTION

1. Field of the Invention

The present invention relates to flip-up mechanism technology and more particularly, to a guide rail type flip-up mechanism for use in a flip electronic product consisting of a main unit and a display, which avoids interference between the main unit and the display when the user opens the display from the main unit.

2. Description of the Related Art

Various mobile flip type mobile electronic products are known. A flip electronic product such as notebook computer, PDA or mobile phone generally comprises a main unit and a display hinged to one side of the main unit by a hinge. A hinge for this application generally comprises an elastically deformable axle barrel and a pivot axle inserted into the axle barrel. The axle barrel is elastically deformable to store elastic restoring energy when the pivot axle is rotated by an external force. This design of hinge is still not satisfactory in function for the disadvantages as follows:

(A) The hinge simply allows the display to be biased on a hinge block, and therefore, the hinge must be mounted at an end part of the display to avoid interference between the hinge block and the display when the display is being biased by an external force; in order to avoid interference, the end part of the display needs to be chamfered, limiting the outer appearance design of the flip electronic product.

(B) Advanced mobile electronic products commonly employ touch design for the display, however, when the user touches the touch screen of the display for a specific touch control, the display can be vibrated or biased due to that the direction of the applied force is same as the biasing direction of the hinge.

SUMMARY OF THE INVENTION

The present invention has been accomplished under the circumstances in view. It is therefore the main object of the present invention to provide a guide rail type flip-up mechanism for use in a flip electronic product consisting of a main unit and a display, which avoids interference between the main unit and the display when the user opens the display from the main unit, and allows free outer appearance design of the flip electronic product without limitation.

To achieve this and other objects of the present invention, a guide rail type flip-up mechanism is provided for use in a flip electronic product comprising a main unit and a display pivotally connected to the main unit. The guide rail type flip-up mechanism comprises a base unit, a linkage unit and a flip member. The base unit comprises a first connection member affixed to the main unit of the flip electronic product, and a guide rod and a first pivot axle disposed at one same side relative to the first connection member. The linkage unit comprises a pivoting member and a displacement member. The pivoting member has one end thereof pivotally connected to the first pivot axle of the base unit, and an opposite end thereof provided with a second pivot axle. The displacement member is coupled to the guide rod of the base unit, and movable back and forth along the guide rod. Further, the displacement member comprises a third pivot axle. The flip member comprises a second connection member affixed to the display of the flip electronic product, and a first axle barrel and a second axle barrel located at one lateral side of the second connection member and respectively coupled to the second pivot axle and third pivot axle of the linkage unit.

DETAILED DESCRIPTION OF THE PREFERRED EMBODIMENT

Referring to FIGS. 1-4, a guide rail type flip-up mechanism in accordance with a first embodiment of the present invention is shown. The guide rail type flip-up mechanism comprises a base unit 1, a linkage unit 2, a flip member 3 and a torsion member 4.

The base unit 1 comprises a first connection member 11, a guide rod 12, a first pivot axle 13 and a spring member 14. The spring member 14 is mounted around the guide rod 12. The first connection member 11 comprises a mounting portion 111, a positioning portion 112 disposed at one lateral side relative to the mounting portion 111, a first position-limiting portion 113 located at one end of the positioning portion 112 and a second position-limiting portion 114 located at an opposite end of the positioning portion 112. The guide rod 12 has two opposite ends thereof respectively connected to the first position-limiting portion 113 and the second position-limiting portion 114. The first pivot axle 13 is connected to the first position-limiting portion 113. Further, the guide rod 12 and the first pivot axle 13 are disposed at the same side relative to the first connection member 11.

The linkage unit 2 comprises a pivoting member 21 and a displacement member 22. The pivoting member 21 has one end thereof pivotally connected to the first pivot axle 13 of the base unit 1, and an opposite end thereof provided with a second pivot axle 23. The displacement member 22 is connected to the guide rod 12 of the base unit 1, comprising a third pivot axle 24. The spring member 14 of the base unit 1 is disposed between the second position-limiting portion 114 of the base unit 1 and the displacement member 22. The displacement member 22 further comprises a position-limiting groove 221 located on one lateral side thereof and disposed at an outer side relative to the positioning portion 112 of the base unit 1, a slot 222, a friction pad 25 mounted in the slot 222. The guide rod 12 of the base unit 1 is inserted through the friction pad 25.

The flip member 3 comprises a second connection member 31, and a first axle barrel 32 and a second axle barrel 33 located at one lateral side of the second connection member 31 and respectively coupled to the second pivot axle 23 and third pivot axle 24 of the linkage unit 2.

The torsion member 4 comprises a base block 41, and a first torsional sleeve coupling 42 and a second torsional sleeve coupling 43 respectively located at two opposite lateral sides of the base block 41 and respectively coupled to the second pivot axle 23 and third pivot axle 24 of the linkage unit 2.

Figure 1:
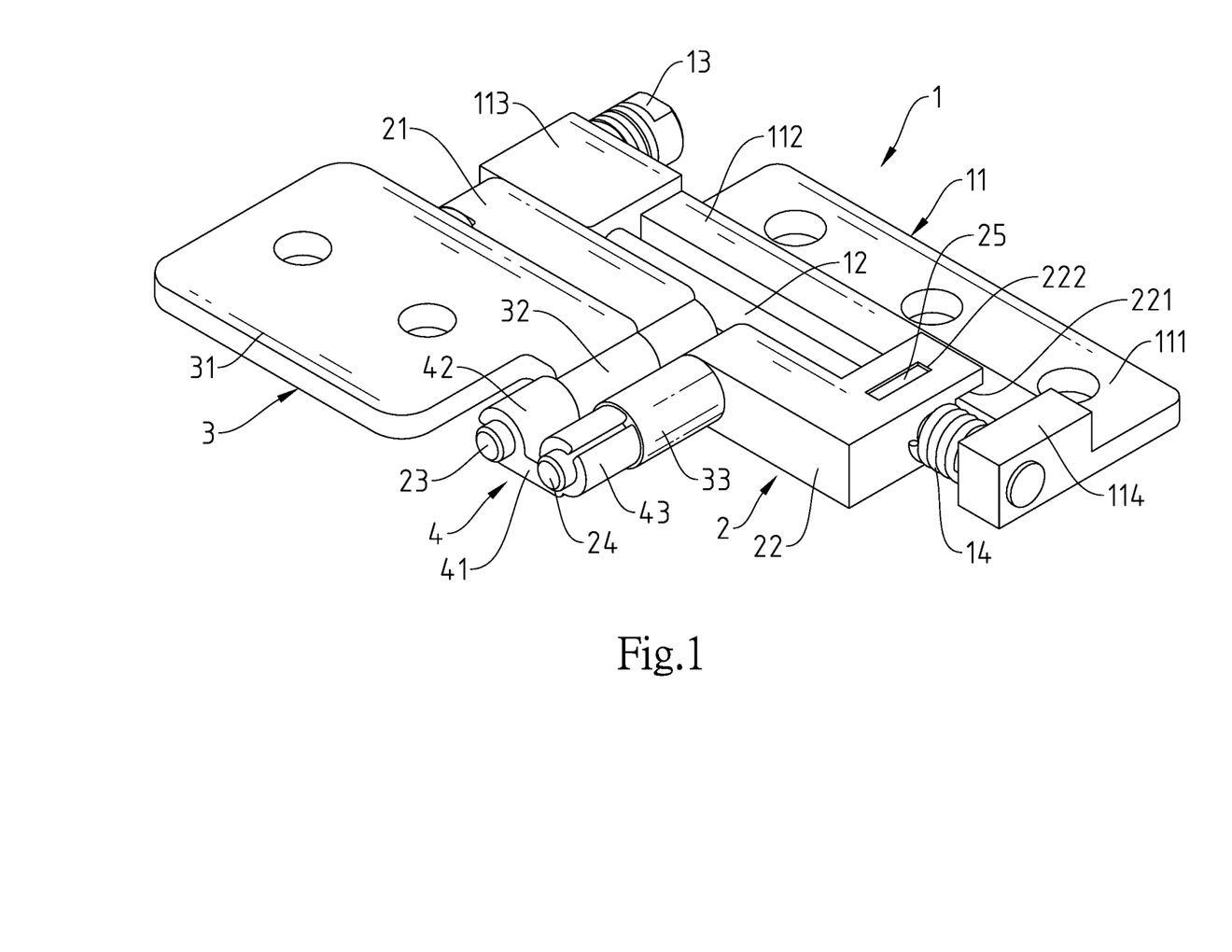
FIG. 1 is an oblique top elevational view of a guide rail type flip-up mechanism in accordance with a first embodiment of the present invention.
Figure 2:
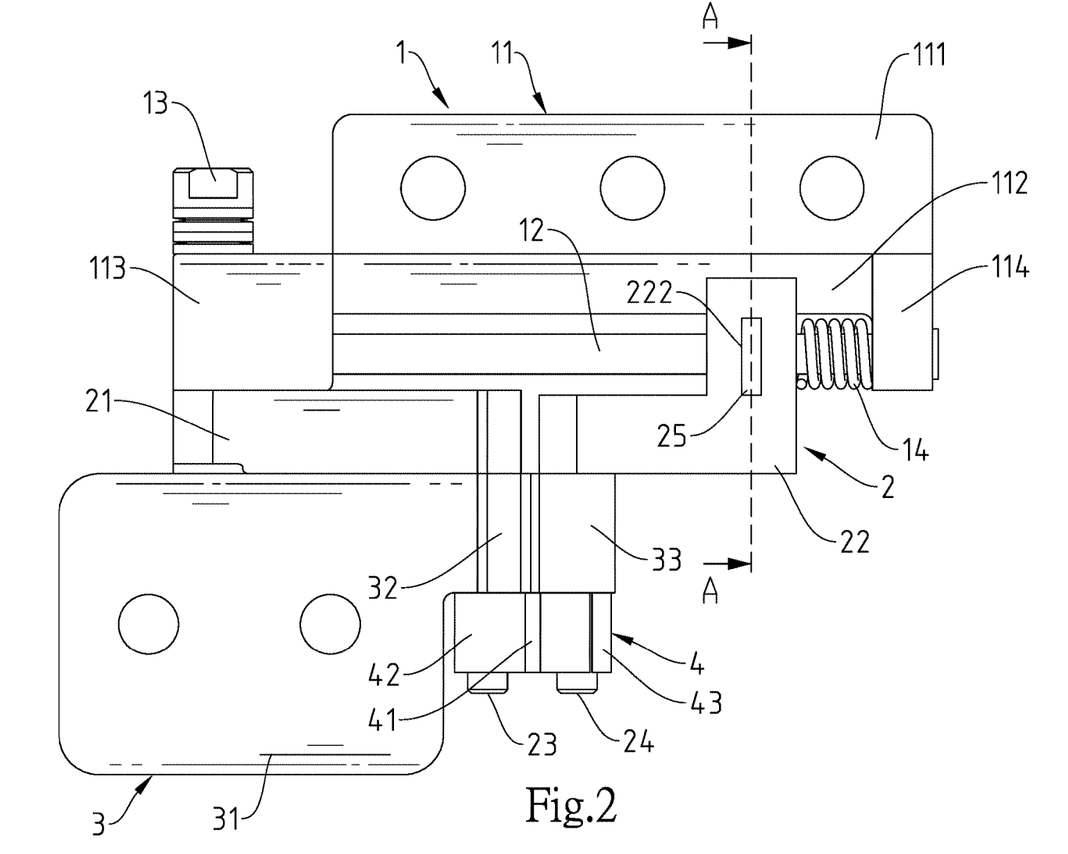
FIG. 2 is a top view of the guide rail type flip-up mechanism in accordance with the first embodiment of the present invention.
Figure 3:
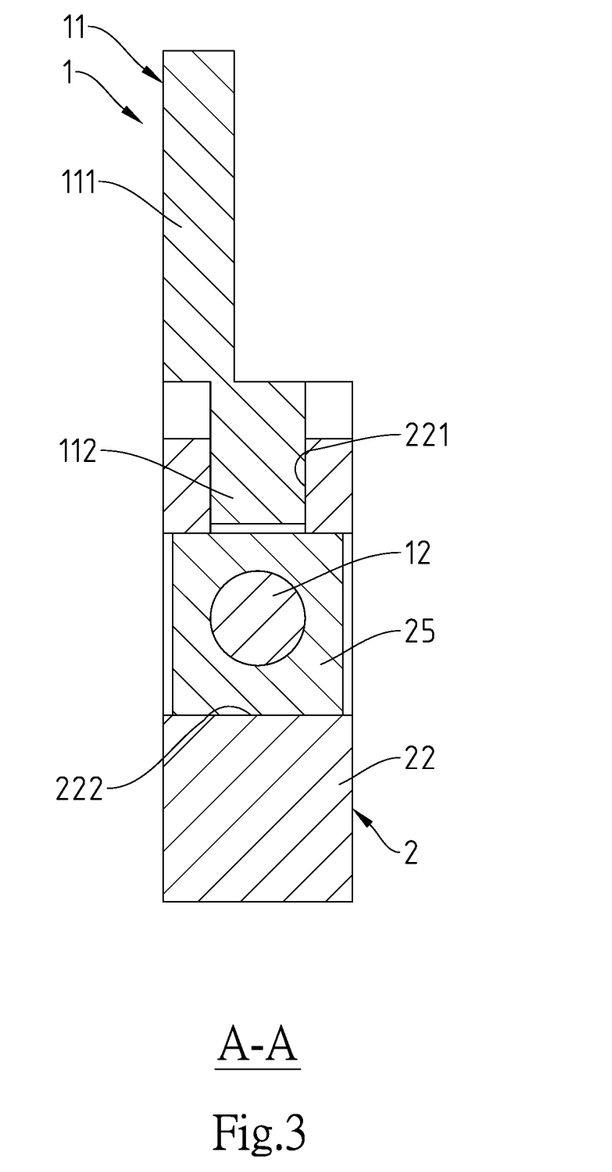
FIG. 3 is a sectional view taken along line A-A of FIG. 2.
Figure 4:
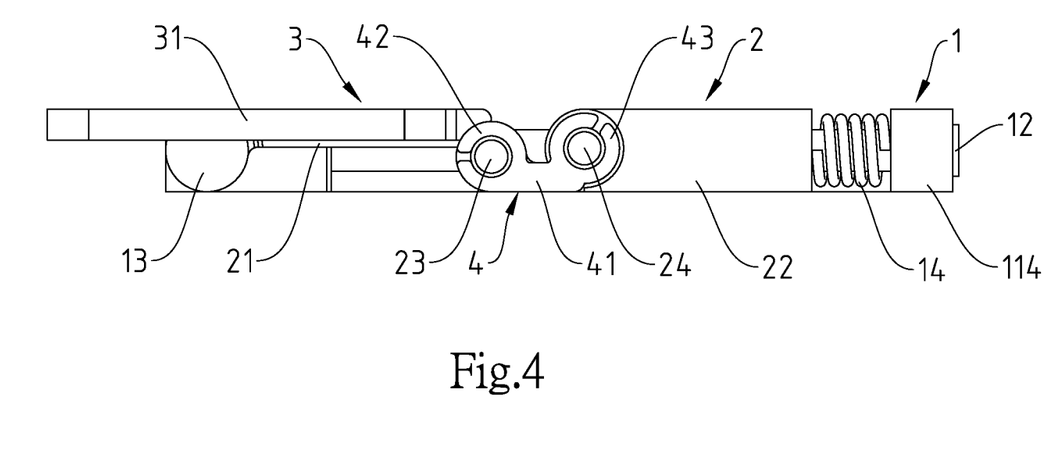
FIG. 4 is a side view of the guide rail type flip-up mechanism in accordance with the first embodiment of the present invention.
Figure 5:
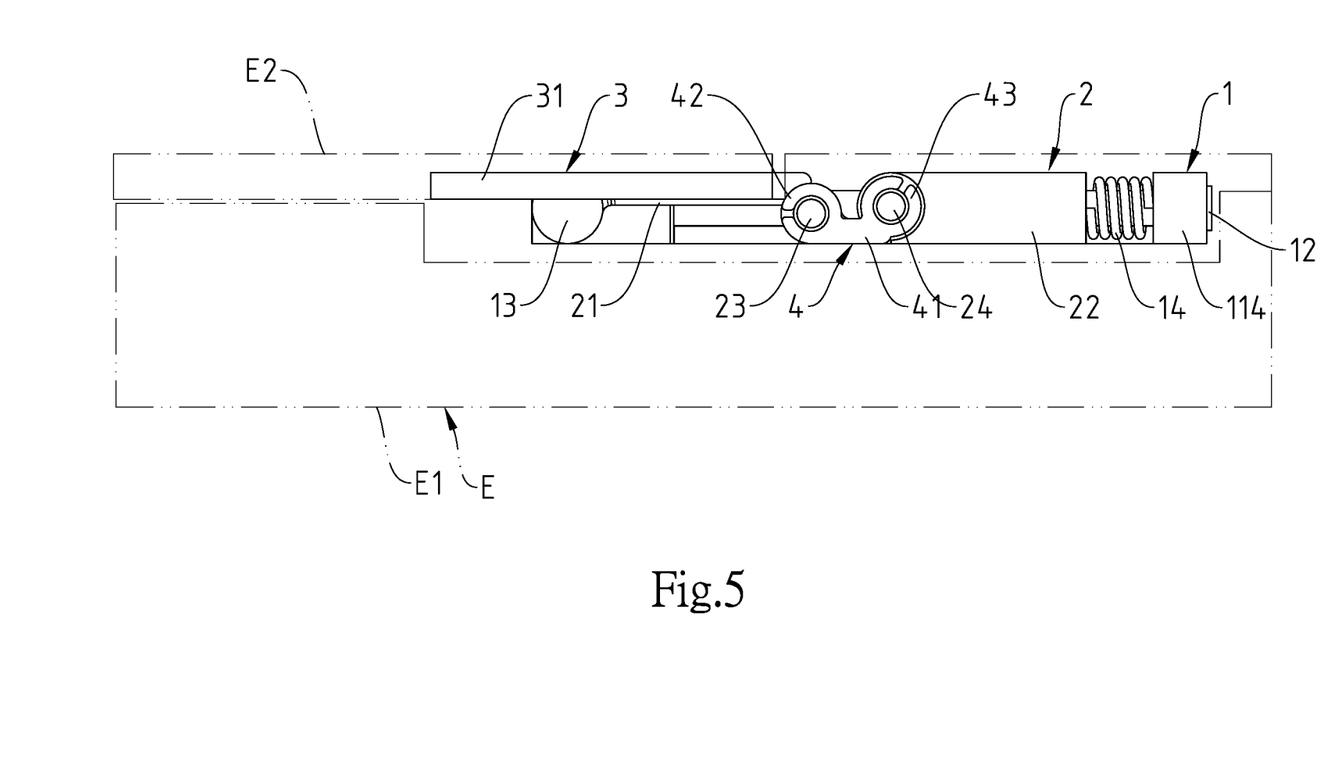
FIG. 5 is a schematic applied view of the first embodiment of the present invention, illustrating the guide rail type flip-up mechanism installed in a mobile flip electronic product.
Figure 6:
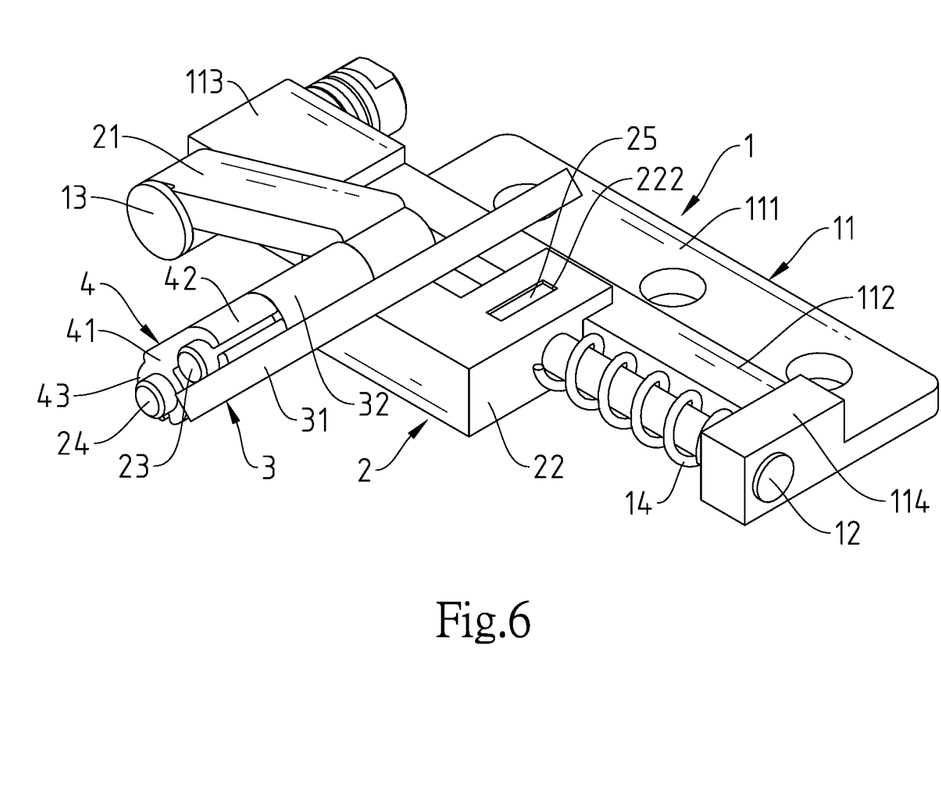
FIG. 6 is an elevational view of the first embodiment of the present invention, illustrating the flip member biased.
Figure 7:
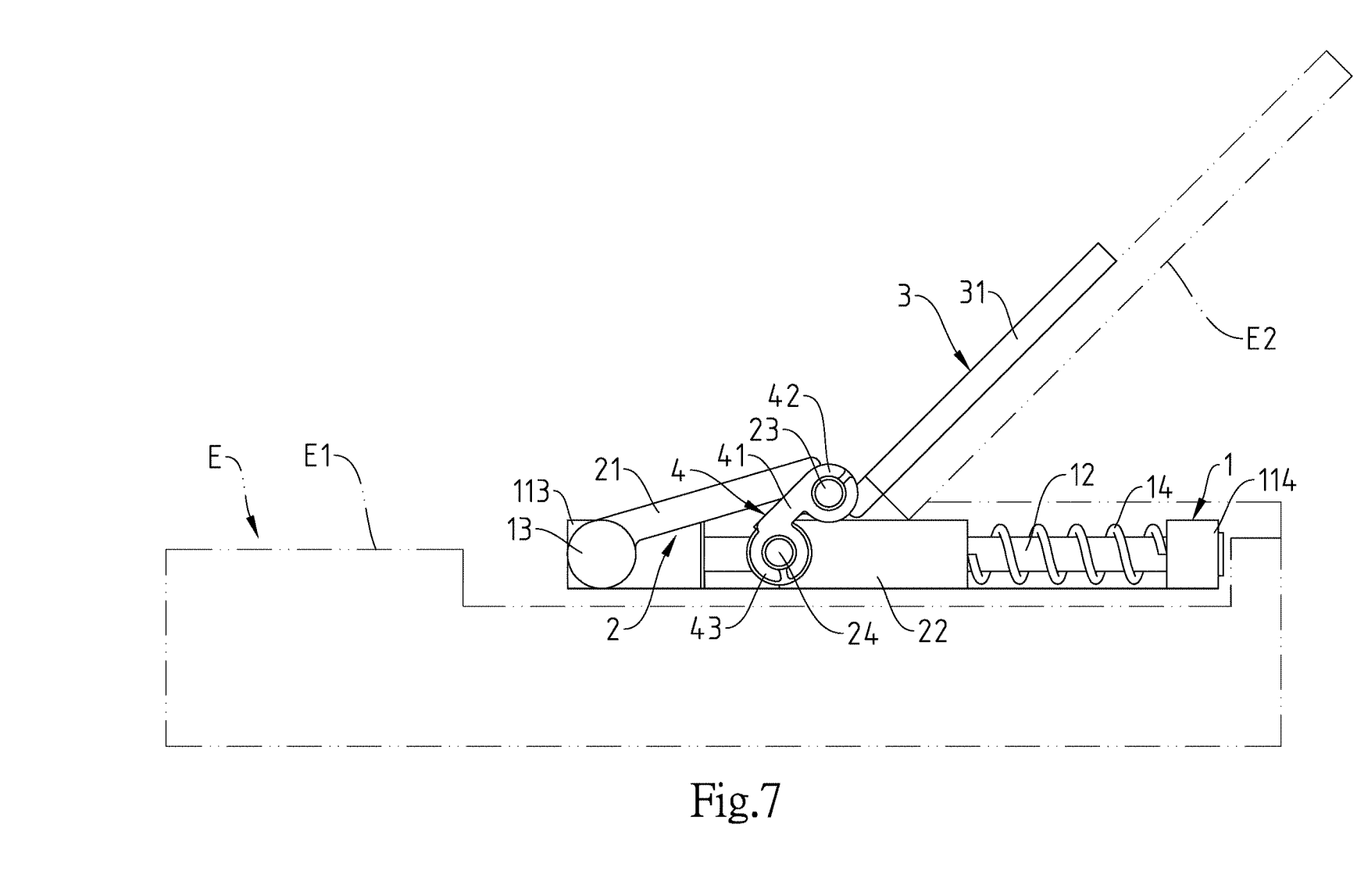
FIG. 7 is a schematic applied view of the first embodiment of the present invention, illustrating the second connection member of the flip member biased with the display of the flip electronic product relative to the main unit.

Referring to FIGS. 1-7, when mounting the guide rail type flip-up mechanism of the present invention in an flip electronic product E consisting of a main unit E1 and a display E2, affix the mounting portion 111 of the base unit 1 to the main unit E1 of the flip electronic product E, and affix the second connection member 31 of the flip member 3 to the display E2 of the flip electronic product E. As illustrated in FIG. 4 and FIG. 5, when closing the display E2 on the main unit E1, the displacement member 22 is forced toward the second position-limiting portion 114 to compress the spring member 14, causing the spring member 14 to store elastic restoring energy for pushing the displacement member 22 toward the first position-limiting portion 113. When the display E2 is closed on the main unit E1, the third pivot axle 24 is disposed above the elevation of the second pivot axle 23, and thus, the elastic restoring energy of the spring member 14 holds the display E2 in position to close on main unit E1 positively. As illustrated in FIGS. 4-7, when the user biases the display E2 in direction away from the main unit E1, the flip member 3 is forced to move the displacement member 22 along the guide rod 12 toward the first position-limiting portion 113. Since the distance between the displacement member 22 and the first pivot axle 13 is shortened and the first axle barrel 32 and second axle barrel 33 of the flip member 3 are respectively coupled to the second pivot axle 23 and third pivot axle 24 of the linkage unit 2, the second axle barrel 33 will be biased downward relative to the first axle barrel 32, and the first axle barrel 32 will be lifted, and thus the display E2 can be lifted and then biased upwards relative to the main unit E1 to avoid interference between the display E2 and the main unit E1

In conclusion, the invention provides a guide rail type flip-up mechanism that has technical features as follows:

(A) The flip member 3 is pivotally connected to the pivoting member 21 and displacement member 22 of the linkage unit 2, so that when the flip member 3 is biased by an external force, the pivoting member 21 is forced to bias upward, and at the same time, the displacement member 22 is forced to move toward the pivoting member 21, and thus, when the guide rail type flip-up mechanism is used in a flip electronic product E consisting of a main unit E1 and a display E2 and when the display E2 is opened from the main unit E1, the display E2 will be lifted and then biased without interfering with the main unit E1. Thus, the outer appearance design of the flip electronic product E can be freely carried out without limitation.

(B) When the user touches the touch screen of the display E2, the touch pressure applied to the touch screen of the display E2 will be evenly distributed through the pivoting member 21 and the displacement member 22 in different directions, avoiding vibration of the display E2; further, because the displacement member 22 is moved along the guide rod 12, the stability of the display E2 is ensured.

What the invention claimed is:

1. A guide rail type flip-up mechanism for use in a flip electronic product comprising a main unit and a display pivotally connected to the main unit, the guide rail type flip-up mechanism comprising:

a base unit comprising a first connection member affixed to said main unit of said flip electronic product, and a guide rod and a first pivot axle disposed at one same side relative to said first connection member;

a linkage unit comprising a pivoting member and a displacement member, said pivoting member having one end thereof pivotally connected to said first pivot axle of said base unit and an opposite end thereof provided with a second pivot axle, said displacement member being coupled to said guide rod of said base unit and movable back and forth along said guide rod, said displacement member comprising a third pivot axle; and a flip member comprising a second connection member affixed to said display of said flip electronic product, and a first axle barrel and a second axle barrel located at one lateral side of said second connection member and respectively coupled to said second pivot axle and said third pivot axle of said linkage unit.

2. The guide rail type flip-up mechanism as claimed in claim 1, wherein said first connection member of said base unit comprises a mounting portion, a positioning portion disposed at one lateral side relative to said mounting portion, a first position-limiting portion located at one end of said positioning portion and a second position-limiting portion located at an opposite end of said positioning portion; said guide rod has two opposite ends thereof respectively connected to said first position-limiting portion and said second position-limiting portion; said first pivot axle is connected to said first position-limiting portion; said displacement member of said linkage unit comprises a position-limiting groove located on one lateral side thereof and disposed at an outer side relative to said positioning portion of said base unit.

3. The guide rail type flip-up mechanism as claimed in claim 2, wherein said guide rod of said base unit is loaded with a spring member, said spring member being stopped between said second position-limiting portion of said base unit and said displacement member of said linkage unit and compressible by said displacement member to store elastic restoring energy for pushing back said displacement member when said displacement member is moved by an external force toward second position-limiting portion.

4. The guide rail type flip-up mechanism as claimed in claim 1, wherein said displacement member of said linkage unit comprises a slot and a friction pad mounted in said slot; said guide rod of said base unit is inserted through said friction pad.

5. The guide rail type flip-up mechanism as claimed in claim 1, further comprising a torsion member, said torsion member comprising a base block, a first torsional sleeve coupling located at one lateral side of said base block and a second torsional sleeve coupling located at an opposite lateral side of said base block, said first torsional sleeve coupling and said second torsional sleeve coupling being respectively coupled to said second pivot axle and said third pivot axle of said linkage unit.

* * * * *